United States Patent
Fu et al.

(10) Patent No.: US 12,273,891 B2
(45) Date of Patent: Apr. 8, 2025

(54) METHOD PROCESSING FOR SPLIT RESOURCES AND PROCESSING DEVICE

(71) Applicant: GUANGDONG OPPO MOBILE TELECOMMUNICATIONS CORP., LTD., Guangdong (CN)

(72) Inventors: Zhe Fu, Guangdong (CN); Jing Xu, Guangdong (CN); Qianxi Lu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 439 days.

(21) Appl. No.: 17/658,618

(22) Filed: Apr. 8, 2022

(65) Prior Publication Data
US 2022/0232619 A1    Jul. 21, 2022

Related U.S. Application Data (63) Continuation of application No. PCT/CN2019/115996, filed on Nov. 6, 2019.

(51) Int. Cl.
*H04W 80/02* (2009.01)
*H04L 1/08* (2006.01)
(Continued)

(52) U.S. Cl.
CPC .............. *H04W 72/23* (2023.01); *H04L 1/08* (2013.01); *H04L 1/1812* (2013.01); *H04W 80/02* (2013.01)

(58) Field of Classification Search
CPC .......... H04W 24/10; H04W 72/23; H04L 1/08
See application file for complete search history.

(56) References Cited

U.S. PATENT DOCUMENTS

| 2019/0149365 A1 | 5/2019 | Chatterjee et al. |
| 2019/0230667 A1 | 7/2019 | Loehr et al. |

(Continued)

FOREIGN PATENT DOCUMENTS

| CN | 109217974 A | 1/2019 |
| CN | 109788565 A | 5/2019 |

(Continued)

OTHER PUBLICATIONS

Motorola Mobility,R5-182941 "Correction to MAC UL Data Transfer test cases". 3GPP TSG RAN WG5#79 Busan, South Korea, May 21-25, 2018. 40 pages.
(Continued)

*Primary Examiner* — Dang T Ton
(74) *Attorney, Agent, or Firm* — PERKINS COIE LLP (57) ABSTRACT

Provided is a processing method for split resources, which includes: receiving authorization information sent by the network apparatus, the authorization information is used to allocate transmission resource to the terminal apparatus; the media access control layer of the terminal apparatus determines that the transmission resource includes at least one split resource; starting or restarting the configuration authorization timer based on the transmission resource or the split resource. In the present solution, when the terminal apparatus determines that the transmission resource authorized by the network apparatus includes at least one split resource, based on the transmission resource or the split resource, the configuration authorization timer is started, which provides a solution for how to process split resources.

17 Claims, 6 Drawing Sheets

(51) Int. Cl.
*H04L 1/1812* (2023.01)
*H04W 72/23* (2023.01)

(56) References Cited

U.S. PATENT DOCUMENTS

| | | | |
|---|---|---|---|
| 2019/0268965 A1 | 8/2019 | Jang et al. | |
| 2024/0155608 A1* | 5/2024 | Park | H04B 7/18513 |

FOREIGN PATENT DOCUMENTS

| | | |
|---|---|---|
| CN | 109906629 A | 6/2019 |
| CN | 110383912 A | 10/2019 |
| WO | 2017049558 A1 | 3/2017 |
| WO | 2018085790 A1 | 5/2018 |

OTHER PUBLICATIONS

Office Action of EP No. 19952138.6, issued on Apr. 6, 2023. 7 pages.
First Office Action of CN No. 202210475886.X, issued on Jun. 17, 2023. 18 pages with English translation.
3GPP TS 38.212 V16.4.0 (Dec. 2020)—3rd Generation Partnership Project; Technical Specification Group Radio Access Network; NR; Multiplexing and channel coding (Release 16) (146 pages).
3GPP TS 38.214 V16.4.0 (Dec. 2020)—3rd Generation Partnership Project; Technical Specification Group Radio Access Network; NR; Physical layer procedures for data (Release 16) (168 pages).
3GPP TS 38.331 V16.3.1 (Jan. 2021)—3rd Generation Partnership Project; Technical Specification Group Radio Access Network; NR; Radio Resource Control (RRC) protocol specification (Release 16) (929 pages).
3GPP TSG RAN WG1 Meeting #98-Bis—R1-1911058—Chongqing, China, Oct. 14-20, 2019—MediaTek Inc., Ramaining Details for Adapation of Cross-Slot Scheduling (7 pages).
3GPP TSG-RAN WG1 #98bis—R1-1911130—Chongqing, China, Oct. 14-20, 2019—Qualcomm Incorporated, Cross-slot scheduling power saving techniques (18 pages).
International Search Report issued Jul. 28, 2020 of PCT/CN2019/115996 (5 pages).
3GPP TSG RAN WG1 #98—R1-1908939—Prague, CZ, Aug. 26-30, 2019—Panasonic, On PUSCH enhancements for NR URLLC (8 pages).
3GPP TS 38.321 V15.7.0 (Aug. 2019)—3rd Generation Partnership Project; Technical Specification Group Radio Access Network; NR; Medium Access Control (MAC) protocol specification (Release 15) (77 pages).
Ericsson "Remaining issues for configuredGrantTimer" Tdoc R2-1803165; 3GPP TSG-RAN WG2 #101 NR; Athens, Greece; Feb. 26-Mar. 2, 2018. 3 pages.
Extended European Search Report for European Application No. 19952138.6 issued Jul. 26, 2022. 11 pages.
MediaTek Inc. "On repetition schemes for NR PUSCH" R1-1911080; 3GPP TSG RAN WG1 Meeting #98bis; Chongqing, China; Oct. 14-20, 2019. 3 pages.

* cited by examiner

METHOD PROCESSING FOR SPLIT RESOURCES AND PROCESSING DEVICE

CROSS-REFERENCE TO RELATED APPLICATION

This application is a continuation application of International Application No. PCT/CN2019/115996, filed on Nov. 6, 2019, the entire disclosure of which is hereby incorporated by reference.

TECHNICAL FIELD

The present disclosure relates to the technical field of communication, and more particularly, to the technical field of segmented resource transmission.

BACKGROUND

A case that a current protocol does not support segmenting of a transmission resource is that, for example, it is impossible for a Physical Uplink Shared Channel (PUSCH) resource to cross a slot boundary. However, in the New Radio Release 16 (NR Re116, a New Radio system of Release 16), such a scenario will be allowed to occur.

In the NR Re116, enhancement to repetition of a PUSCH is made and some restrictions are relaxed. Therefore, one or more PUSCHs may occur in each slot, and time domain resources where a same PUSCH is located may be different. Since an application scenario is no longer restricted, data may be scheduled in real time, further reducing data transmission delay.

However, after the restrictions are relaxed, a specific solution of how to process a resource crossing a slot boundary or how to process a segmented resource has not yet been concluded.

SUMMARY

The present disclosure provides a method and apparatus for processing a segmented resource, so as to solve the above technical problems.

The present disclosure provides following technical solutions.

A method for processing a segmented resource includes: receiving a grant sent by a network device, the grant being used for allocating a transmission resource to a terminal device; determining, by a physical layer or Media Access Control layer of the terminal device, that the transmission resource contains at least one segmented resource; and starting or restarting a Configured Grant timer based on the transmission resource or the segmented resource.

A method for processing a segmented resource includes: sending a grant to a terminal device, the grant being used for allocating a transmission resource to the terminal device, wherein a Media Access Control layer of the terminal device determines that the transmission resource contains at least one segmented resource, and starts or restarts a Configured Grant timer based on the transmission resource or the segmented resource; and receiving data sent by the terminal device through the transmission resource.

An apparatus for processing a segmented resource includes: a grant receiving unit configured to receive a grant sent by a network device, the grant being used for allocating a transmission resource to a terminal device; a segmented resource determining unit configured to determine that the transmission resource contains at least one segmented resource; and a timer starting unit configured to start or restart a Configured Grant timer based on the transmission resource or the segmented resource.

An apparatus for processing a segmented resource includes: a grant sending unit configured to send a grant to a terminal device, the grant being used for allocating a transmission resource to the terminal device, wherein a segmented resource determining unit of the terminal device determines that the transmission resource contains at least one segmented resource, and a timer starting unit of the terminal device starts or restarts a Configured Grant timer based on the transmission resource or the segmented resource; and a data receiving unit configured to receive data sent by the terminal device through the transmission resource.

An uplink transmission apparatus includes a processor, a memory, and a network interface; the processor invokes a program in the memory to execute the method for processing the segmented resource disclosed in any one of implementations of the present application, and send out an execution result through the network interface.

A chip includes a processor for invoking and running a computer program from a memory, and a device having the chip installed thereon executes the method for processing the segmented resource disclosed in any one of implementations of the present application.

A computer-readable storage medium has stored therein a program for an uplink transmission method, wherein when the program for the uplink transmission method executed by a processor, the method for processing the segmented resource disclosed in any one of implementations of the present application is implemented.

A computer program product is stored in a non-transitory computer-readable storage medium, wherein when the computer program is executed, the method for processing the segmented resource disclosed in any one of implementations of the present application is implemented.

DETAILED DESCRIPTION

In order to make objectives, technical solutions and advantages of the present disclosure clearer, the present disclosure will be described in further detail below in conjunction with the drawings and implementations. It should be understood that the implementations described herein are only for a purpose of explaining the present disclosure and are not intended to limit the present disclosure. However, the present disclosure may be implemented in many different forms and is not limited to the implementations described herein. On the contrary, a purpose of providing these implementations is to make understanding of disclosed contents of the present utility model more thorough and comprehensive.

Unless otherwise defined, all technical and scientific terms used herein have same meanings as those commonly understood by those skilled in the technical field of the present disclosure. Terms used in the specification of the present disclosure herein are for a purpose of describing specific implementations only, but are not intended to limit the present disclosure. The term "and/or" used herein includes any and all of combinations of one or more related listed items.

Figure 1:
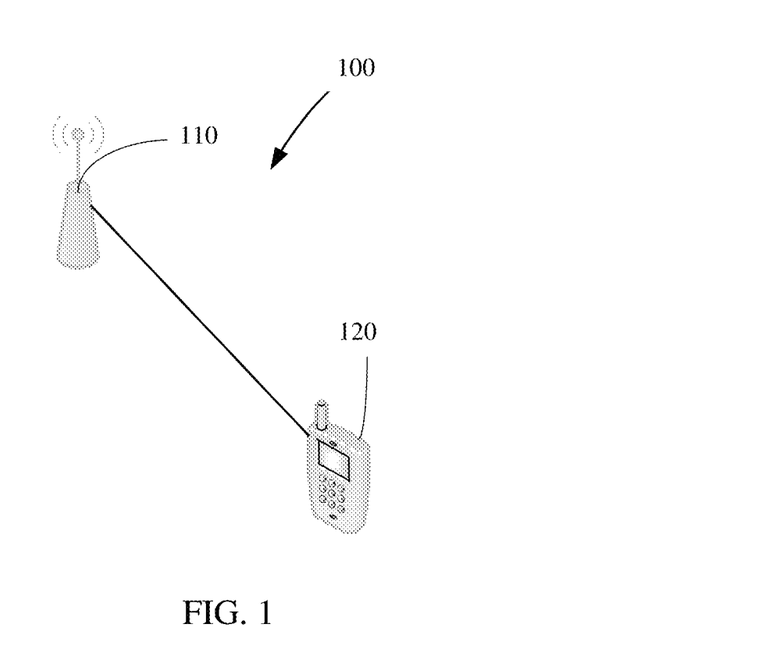
FIG. 1 is an architecture diagram of a system to which an implementation of the present application is applied.

Referring to FIG. 1, FIG. 1 shows a wireless communication system 100 to which an implementation of the present application is applied. The wireless communication system includes a network device 110 and at least one User Equipment 120 located within a coverage area of the network device 110.

Optionally, the wireless communication system 100 may include a plurality of network devices, and other numbers of User Equipment may be included within a coverage area of each network device, which is not limited in the implementations of the present application.

The wireless communication system 100 in the implementations of the present application may be following various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunications System (UMTS), Wireless Local Area Networks (WLANs), Wireless Fidelity (WiFi), a next generation communication system, or another communication system.

Optionally, the communication system in the implementations of the present application may be applied to a Carrier Aggregation (CA) scenario, or a Dual Connectivity (DC) scenario, or a Standalone (SA) network deployment scenario.

The network device 110 may provide communication coverage for a specific geographical area, and may communicate with a User Equipment (e.g., UE) located within the coverage area. Optionally, the network device 100 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a relay station, an access point, a vehicle-mounted device, a wearable device, a network side device in a 5G network, or a network device in a future evolved Public Land Mobile Network (PLMN).

The User Equipment 120 may be mobile or fixed. Optionally, the User Equipment 120 may refer to an access terminal, a User Equipment (UE), a subscriber unit, a subscriber station, a mobile station, a mobile platform, a remote station, a remote terminal, a mobile device, a User Equipment, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN).

A First Implementation

Figure 2:
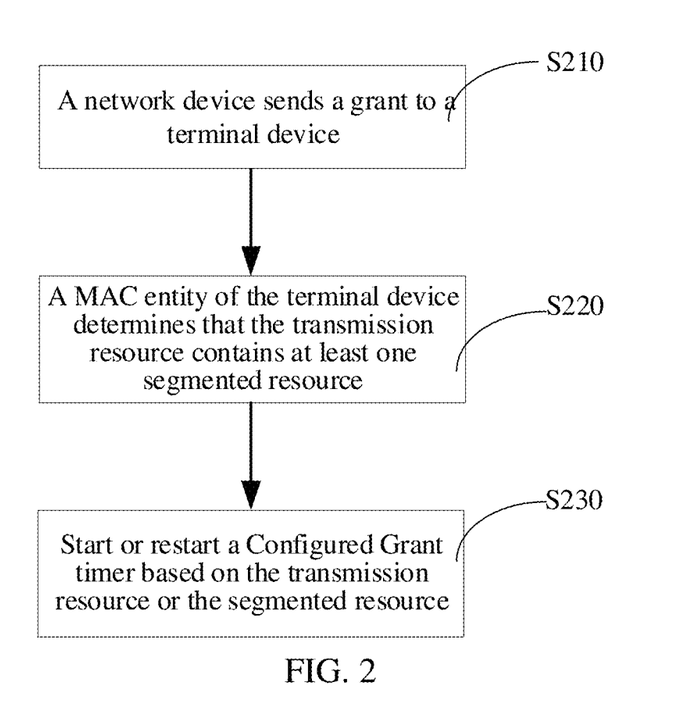
FIG. 2 is a flowchart of a method for processing a segmented resource according to a first implementation of the present application.

Referring to FIG. 2, FIG. 2 shows a method for processing a segmented resource according to the first implementation of the present application, which includes following acts.

In S210, a network device sends a grant to a terminal device, the grant being used for allocating a transmission resource to the terminal device.

Optionally, the transmission resource may be a Configured Grant (CG) resource or a Dynamic Grant (DG) resource. Optionally, the transmission resource is a nominal repetition or a non-segmented grant resource.

In S220, a physical layer or a Media Access Control (MAC) layer of the terminal device determines that the transmission resource contains at least one segmented resource. Specifically, the physical layer of the terminal device is connected to a MAC entity to determine that the transmission resource contains the at least one segmented resource.

Optionally, the segmented resource may be a CG resource or a DG resource.

Optionally, the segmented resource is an actual repetition or a segmented grant resource.

In the New Radio Release 16 (NR Re116, Release 16 of New Radio), enhancement to repetition of a Physical Uplink Shared Channel (PUSCH) is made, some restrictions are relaxed, that is, there may be one or more PUSCHs in each slot, and time domain resources where a same PUSCH is located may be different.

Figure 3:
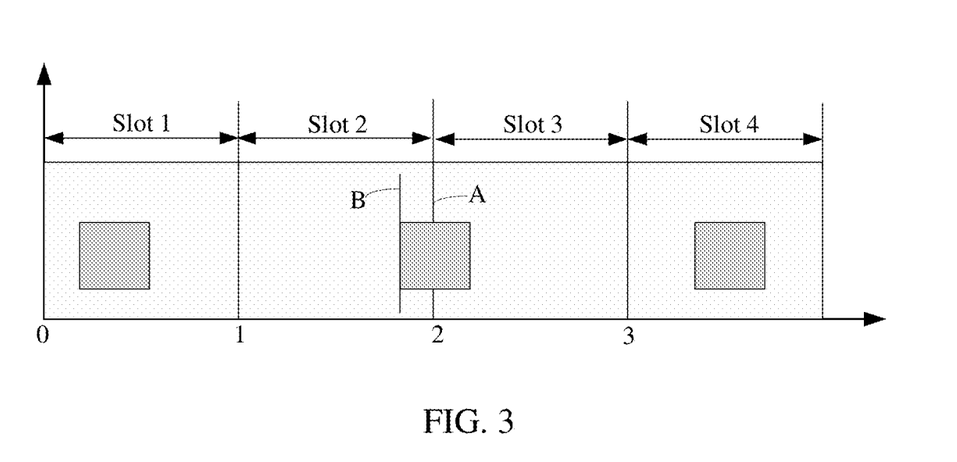
FIG. 3 is a schematic diagram of a transmission resource crossing slots in the present application.
Figure 4A:
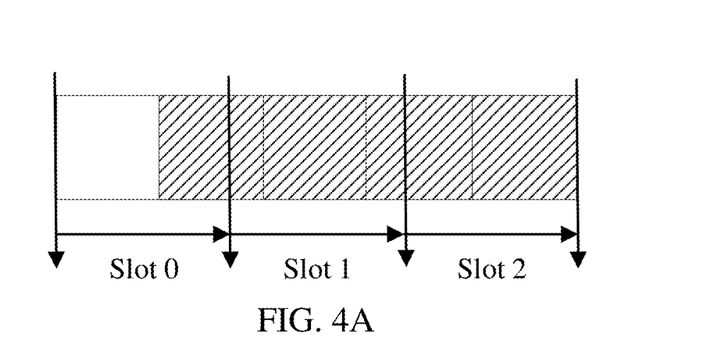
FIG. 4A is a schematic diagram of an example in which a resource crossing slots is segmented into at least two independent resources.
Figure 4B:
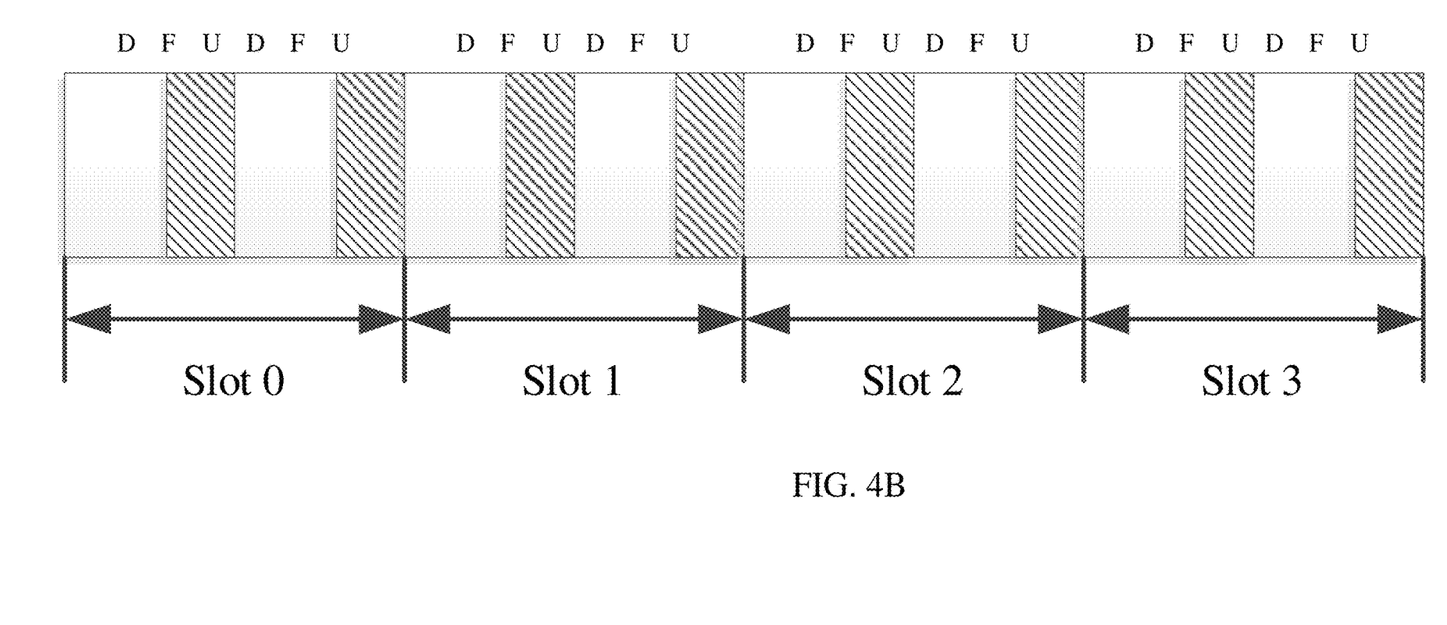
FIG. 4B is schematic diagram of another example in which a resource crossing slots is segmented into at least two independent resources.

Referring to FIG. 3, the segmented resource as described in the implementations of the present application will occur, and the segmented resource refers to a transmission resource crossing slots as shown in FIG. 3, that is, a case that a PUSCH resource crosses a boundary A between slots 2 and 3 occurs. The physical layer or the MAC layer of the terminal device may start a timer for a nominal repetition in a timeline B. Referring further to FIGS. 4A and 4B, a shaded portion in FIGS. 4A and 4B is a PUSCH resource. FIG. 4A shows a case that a duration of a PUSCH crossing slots. One PUSCH crossing slots is segmented into two or three independent PUSCHs, that is, three independent Transport Blocks (TBs) are transmitted. FIG. 4B shows a case where there is more than one PUSCH in one slot. When one PUSCH encounters a downlink and flexible resource, it is automatically segmented into two or more PUSCHs for transmitting independent TBs. Thus, data may be scheduled in real time, further reducing data transmission delay.

However, for such case, the terminal device needs to segment the PUSCH resource into two or more independent PUSCH resources for transmission. That is to say, a configured or indicated resource, when transmitted by the terminal device, may be segmented into at least two resources for transmission, as appropriate. Each segmented resource is independently encoded, or in other words, data is independently encoded based on the segmented resource.

In S230, a Configured Grant timer (ConfiguredGrant-Timer) is started or restarted based on the transmission resource or the segmented resource.

Optionally, S230 includes: the Configured Grant timer is started or restarted when the transmission resource is a CG resource or when the transmission resource is a DG resource and a corresponding Hybrid Automatic Repeat reQuest (HARQ) process is a HARQ process configured for the Configured Grant resource.

Optionally, time at which the timer is started in S230 is one of following: when a Media Access Control layer Protocol Data Unit (MAC PDU) is acquired, when the MAC PDU is sent, when a retransmission is indicated, or when a grant starts to be transmitted, when the transmission resource is transmitted, when the segmented resource is transmitted, when a MAC PDU corresponding to the transmission resource is transmitted, when a MAC PDU corresponding to the segmented resource is transmitted, when retransmission of a HARQ process corresponding to the segmented resource is indicated, when retransmission of a MAC PDU corresponding to the segmented resource is indicated, when retransmission of a HARQ process corresponding to the transmission resource is indicated, when retransmission of a MAC PDU corresponding to the transmission resource is indicated.

Optionally, S220 includes: the Media Access Control layer of the terminal device determines that the transmission resource contains at least one segmented resource according to first information, wherein the first information is resource configuration information of a Physical Uplink Shared Channel (PUSCH).

Optionally, the first information is indication information in Downlink Control Information (DCI) or a Radio Resource Control (RRC) signaling, which is used for indicating whether the transmission resource is a segmented resource, or whether the transmission resource is a resource crossing a slot boundary, or whether the transmission resource is a resource that is segmented by F/D.

Optionally, the first information is information sent by the physical layer of the terminal device to the Media Access Control layer, which is used for indicating whether the transmission resource is a segmented resource, or whether the transmission resource is a resource crossing a slot boundary, or whether the transmission resource is a resource that is segmented by F/D. At this time, the physical layer of the terminal device determines whether the transmission resource is a segmented resource, and sends the information to the MAC layer.

Optionally, S220 includes: the MAC layer determines that the transmission resource contains the at least one segmented resource according to one of following situations: configuration information of a Physical Uplink Shared Channel (PUSCH) resource; indication information in DCI or RRC; indication information in Downlink Control Information (DCI) or a Radio Resource Control (RRC) signaling; at least one transmission resource crosses a slot boundary; a duration of the at least one transmission resource crosses a flexible symbol and a downlink symbol, i.e., is segmented by the flexible symbol and the downlink symbol; at least one grant crosses slots; or, a duration of the at least one grant resource crosses a flexible symbol or a downlink symbol.

The first implementation of the present application discloses the method for processing the segmented resource. When the terminal device determines that the transmission resource granted by the network device contains the at least one segmented resource, the Configured Grant timer is started based on the transmission resource or the segmented resource, thereby providing a solution for how to process a segmented resource.

A Second Implementation

Figure 5:
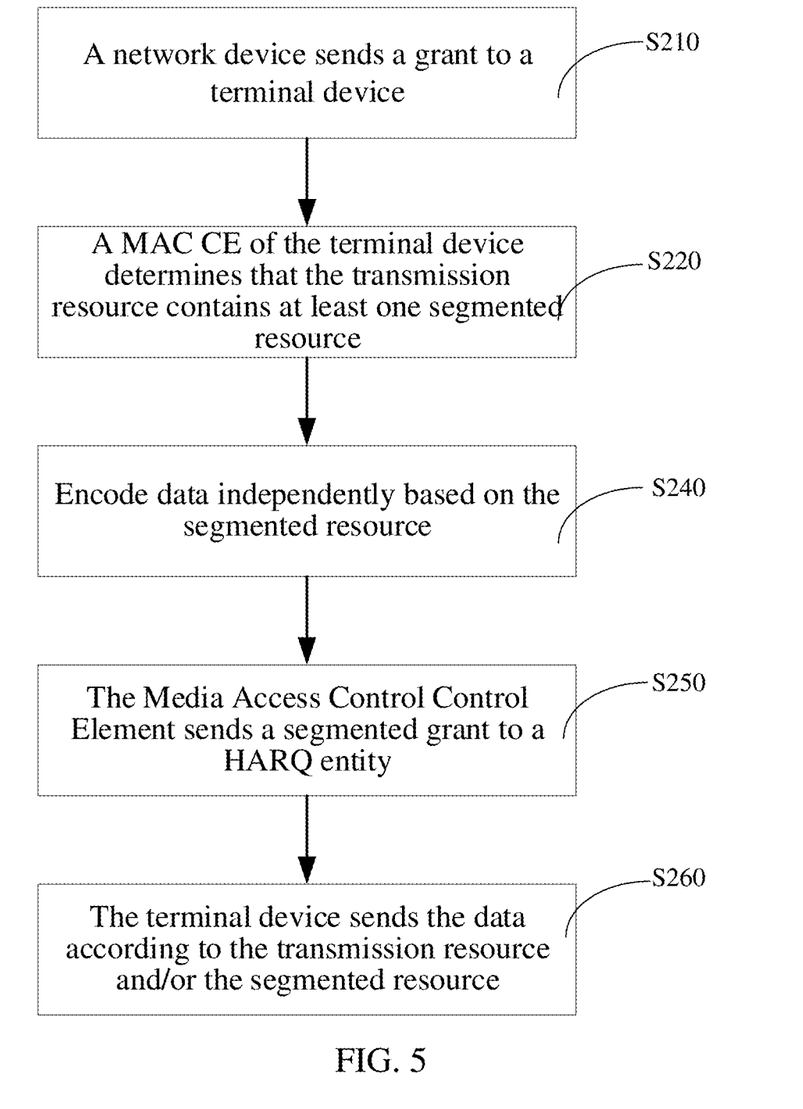
FIG. 5 is a flowchart of a method for processing a segmented resource according to a second implementation of the present application.

Referring to FIG. 5, FIG. 5 shows a method for processing a segmented resource according to the first implementation of the present application, which includes following acts.

In S210, a network device sends a grant to a terminal device, the grant being used for allocating a transmission resource to the terminal device.

In S220, a physical layer or a MAC layer of the terminal device determines that the transmission resource contains at least one segmented resource.

In S240, data is independently encoded based on the segmented resource.

Optionally, S230 in the first implementation may be included in the specific second implementation.

Optionally, specific contents of S210, S220, and S230 may be referred to related contents in the first implementation above, which will not be repeated here.

Optionally, the method further includes following acts.

In S250, the Media Access Control layer sends a segmented grant to a Hybrid Automatic Repeat reQuest (HARQ) entity, wherein the segmented grant is a grant corresponding to the transmission resource and/or the segmented resource.

In S260, the terminal device sends the data according to the transmission resource and/or the segmented resource.

Optionally, the Media Access Control layer sending the segmented grant to the HARQ entity of S250 includes: the Media Access Control layer indicating at least one of following to a corresponding HARQ process: a nominal repetition, an initial segmented grant of the segmented grant, and HARQ information. An advantage of this mode is that the segmented resource may be processed according to repetition of an existing protocol.

Specifically, after an initial uplink segmented grant in this grant or the nominal repetition is delivered to a HARQ entity, each segmented transmission in the grant is a separate uplink grant. That is to say, a non-initial segmented grant is not delivered to a HARQ entity. UE MAC generates a MAC PDU associated to a size of the initial segmented grant or the grant (or nominal repetition). For the non-initial segmented grant, the MAC instructs an identified HARQ process to trigger a retransmission.

Optionally, the Media Access Control layer sending the segmented grant to the HARQ entity of S250 includes: the Media Access Control layer indicating each segmented grant of segmented grant and/or HARQ information to a corresponding HARQ process, wherein the segmented grant is a grant corresponding to the segmented resource. An advantage of this mode is that a new solution is provided for processing the segmented resource.

Specifically, each segmented transmission in the grant is a separate uplink grant. That is, MAC will deliver each segmented grant of the grant to the HARQ entity. UE MAC generates a MAC PDU associated to a size of an initial segmented grant or the grant (nominal repetition). For a non-initial segmented grant, the MAC instructs an identified HARQ process to trigger a retransmission.

Optionally, the method further includes: the Media Access Control layer processes an initial segmented grant of the segmented grant according to a new transmission; and the Media Access Control layer processes other segmented grants corresponding to the segmented grant according to a retransmission or an independent uplink (UL) grant.

Optionally, the Media Access Control layer processing the initial segmented grant of the segmented grant according to the new transmission includes: the Media Access Control layer generating a Media Access Control Protocol Data Unit (MAC PDU) according to a size of a complete grant or a size of a nominal repetition; or the Media Access Control layer generating the MAC PDU according to a size of the initial segmented grant.

Optionally, the Media Access Control layer sending the segmented grant to the HARQ entity further includes: the Media Access Control layer indicating second information to the HARQ entity, wherein the second information includes at least one piece of following information: indicating that the grant is a segmented grant; indicating a size of an initial segment grant of the segmented grant; indicating a size of the nominal repetition; and indicating a size of a grant corresponding to the segmented grant.

Optionally, if the transmission resource or the segmented grant is a part of a repetition and grant bundle, and the transmission resource or the segmented grant is not a first repetition, then the nominal repetition or an initial segmented grant of the segmented grant or an initial segmented grant of the nominal repetition is processed according to a retransmission or an independent uplink (UL) grant.

Data sent finally by the terminal device to the network device through the transmission resource and/or the segmented resource is received. The method for processing the segmented resource according to the second implementation of the present application provides a solution for how to process a segmented resource.

A Third Implementation

Figure 6:
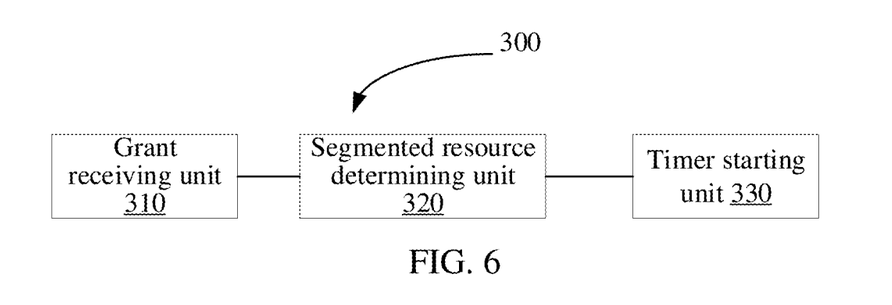
FIG. 6 is a block diagram of an apparatus for processing a segmented resource according to a third implementation of the present application.

Referring to FIG. 6, FIG. 6 shows an apparatus 300 for processing a segmented resource according to the third implementation of the present application. The apparatus includes: a grant receiving unit 310 configured to receive a grant sent by a network device, the grant being used for allocating a transmission resource to a terminal device; a segmented resource determining unit 320 configured to determine that the transmission resource contains at least one segmented resource; and a timer starting unit 330 configured to start or restart a Configured Grant timer based on the transmission resource or the segmented resource.

Optionally, the timer starting unit 330 is specifically configured to start or restart the Configured Grant timer based on the transmission resource or the segmented resource when the transmission resource is a CG resource or when the transmission resource is a DG resource and a corresponding Hybrid Automatic Repeat reQuest (HARQ) process is a HARQ process configured for the CG resource.

Optionally, the timer starting unit 330 is specifically configured to start or restart the timer based on the transmission resource or the segmented resource at one of following time: when a Media Access Control layer Protocol Data Unit (MAC PDU) is acquired, when the MAC PDU is sent, when a retransmission is indicated, when a grant starts to be transmitted, when the transmission resource is transmitted, when the segmented resource is transmitted, when a MAC PDU corresponding to the transmission resource is transmitted, when a MAC PDU corresponding to the segmented resource is transmitted, when retransmission of a HARQ process corresponding to the segmented resource is indicated, when retransmission of a MAC PDU corresponding to the segmented resource is indicated, when retransmission of a HARQ process corresponding to the transmission resource is indicated, and when retransmission of a MAC PDU corresponding to the transmission resource is indicated.

Optionally, the segmented resource determining unit 320 is specifically configured to determine that the transmission resource contains the at least one segmented resource according to first information, wherein the first information is resource configuration information of a Physical Uplink Shared Channel (PUSCH).

Optionally, the first information is indication information in Downlink Control Information (DCI) or a Radio Resource Control (RRC) signaling, which is used for indicating whether the transmission resource is a segmented resource, or whether the transmission resource is a resource crossing a slot boundary, or whether the transmission resource is a resource that is segmented by F/D.

Optionally, the first information is information sent by a physical layer of the terminal device to the segmented resource determining unit, which is used for indicating whether the transmission resource is a segmented resource, or whether the transmission resource is a resource crossing a slot boundary, or whether the transmission resource is a resource that is segmented by F/D. At this time, the physical layer of the terminal device determines whether the transmission resource is a segmented resource, and sends the information to the MAC layer.

Optionally, the segmented resource determining unit 320 is specifically configured to determine that the transmission resource contains the at least one segmented resource according to one of following situations: configuration information of the resource; indication information in DCI or RRC; the at least one transmission resource crosses a slot boundary; a duration of the at least one transmission resource crosses a flexible symbol or a downlink symbol; the at least one grant crosses slots; or, a duration of the at least one grant resource crosses a flexible symbol or a downlink symbol.

Details that are not exhaustive in the third implementation may be referred to corresponding contents in the first implementation described above and will not be repeated here.

A Fourth Implementation

Figure 7:
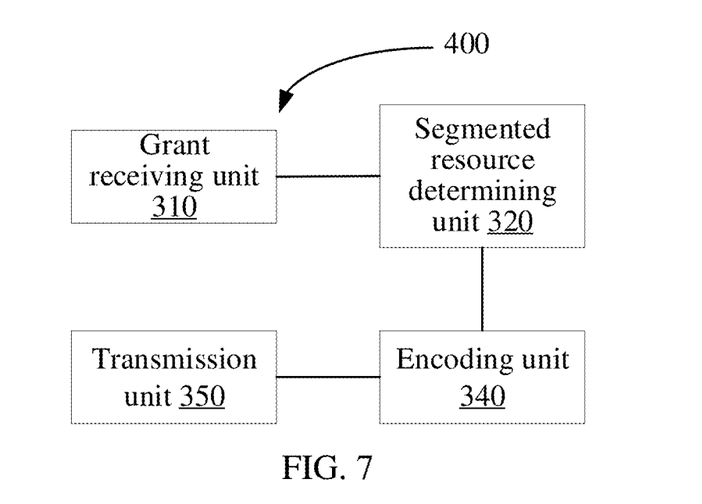
FIG. 7 is a block diagram of an apparatus for processing a segmented resource according to a fourth implementation of the present application.

Referring to FIG. 7, FIG. 7 shows an apparatus 400 for processing a segmented resource according to the fourth implementation of the present application. The apparatus includes: a grant receiving unit 310 configured to receive a grant sent by a network device, the grant being used for allocating a transmission resource to a terminal device; specific contents may be referred to corresponding contents in the first to third implementations and will not be repeated here; a segmented resource determining unit 320 configured to determine that the transmission resource contains at least one segmented resource; specific contents may be referred to corresponding contents in the first to third implementations and will not be repeated here; and an encoding unit 340 configured to independently encode data based on the segmented resource.

Optionally, in the fourth implementation, the apparatus 400 may further include a timer starting unit 330.

Optionally, specific contents of the grant receiving unit 310, the segmented resource determining unit 320, and the timer starting unit 330 may be referred to related contents in the third implementation described above, and will not be repeated here.

Optionally, the apparatus further includes: a transmission unit 350 configured to send a segmented grant to a HARQ entity, wherein the segmented grant is a grant corresponding to the transmission resource and/or the segmented resource. Thus, the apparatus transmits the data according to the transmission resource of the segmented grant.

Optionally, the transmission unit is specifically configured to send at least one piece of following information to the HARQ entity: a nominal repetition, an initial segmented grant of a segmented grant, and HARQ information, which are indicated to a corresponding HARQ process.

Optionally, the transmission unit is specifically configured to indicate each segmented grant of a segmented grant and/or HARQ information to a corresponding HARQ process, wherein the segmented grant is a grant corresponding to the segmented resource.

Optionally, the transmission unit is further configured to process an initial segmented grant of the segmented grant according to a new transmission; and process another segmented grant corresponding to the segmented grant according to a retransmission or an independent uplink (UL) grant.

Optionally, the transmission unit is configured to process the initial segmented grant of the segmented grant according to the new transmission, specifically, the transmission unit is configured to generate a Media Access Control Protocol Data Unit (MAC PDU) according to a size of a complete grant or a size of a nominal repetition; or generate the MAC PDU according to a size of the initial segmented grant.

Optionally, the transmission unit is further configured to indicate second information to the HARQ entity, wherein the second information includes at least one piece of following information: indicating that the grant is a segmented grant; indicating a size of an initial segment grant of the segmented grant; indicating a size of the nominal repetition; and indicating a size of a grant corresponding to the segmented grant.

Optionally, if the transmission resource or the segmented grant is a part of a repetition and grant bundle, and the transmission resource or the segmented grant is not a first repetition, then the transmission unit is further configured to process the nominal repetition or an initial segmented grant of the segmented grant or an initial segmented grant of the nominal repetition according to a retransmission or an independent uplink (UL) grant. Details that are not exhaustive in the fourth implementation may be referred to same or corresponding contents in the first to third implementations described above and will not be repeated here.

A Fifth Implementation

Figure 8:
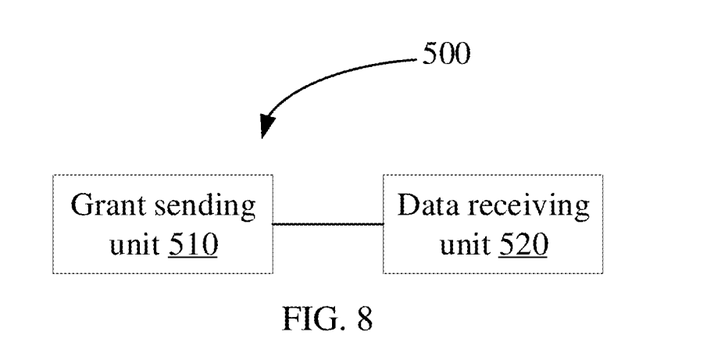
FIG. 8 is a block diagram of an apparatus for processing a segmented resource according to a fifth implementation of the present application.

Referring to FIG. 8, FIG. 8 shows an apparatus 500 for processing a segmented resource according to the fifth implementation of the present disclosure. The apparatus includes: a grant sending unit 510 configured to send a grant to a terminal device, the grant being used for allocating a transmission resource to the terminal device, wherein a segmented resource determining unit of the terminal device determines that the transmission resource contains at least one segmented resource; and a timer starting unit of the terminal device starts or restarts a Configured Grant timer based on the transmission resource or the segmented resource; and a data receiving unit 520 configured to receive data sent by the terminal device through the transmission resource.

A Sixth Implementation

Figure 9:
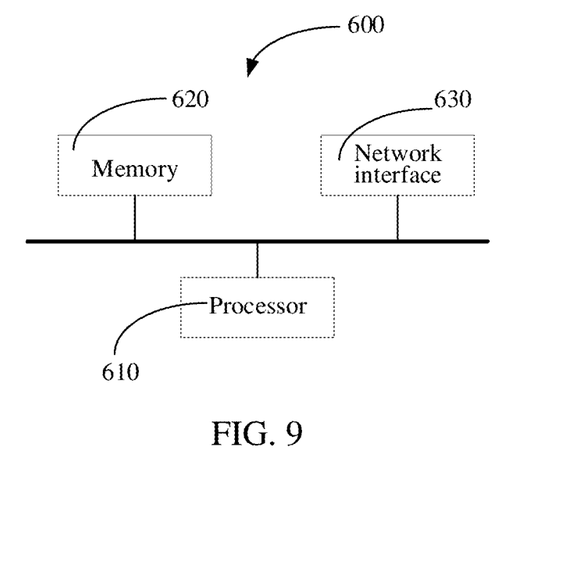
FIG. 9 is a schematic diagram of a structure of an apparatus for processing a segmented resource according to a sixth implementation of the present application.

Referring to FIG. 9, FIG. 9 shows a schematic diagram of a structure of an apparatus 600 for processing a segmented resource according to the fourth implementation of the present application. The apparatus 600 includes a processor 610, a memory 620, and a network interface 630. The processor 610 invokes a program in the memory 620 to execute a method for processing a segmented resource according to the first implementation, and send out an execution result through the network interface 630.

The processor 610 may be an independent component or a unified name of a plurality of processing elements. For example, the processor 610 may be a Central Processing Unit (CPU), an Application Specific Integrated Circuit (ASIC), or one or more integrated circuits configured to implement the methods described above, such as at least one Digital Signal Processor (DSP) or at least one Field Programmable Gate Array (FPGA).

The present disclosure is described with reference to flowcharts and/or block diagrams of the methods, devices (systems), computer programs, and computer program products according to the implementations of the present disclosure. It should be understood that each flow and/or block in the flowcharts and/or block diagrams, and combinations of flows and/or blocks in the flowcharts and/or block diagrams may be implemented by computer program instructions. These computer program instructions may be provided to a general purpose computer, a special purpose computer, an embedded processor, a chip, or a processor of another programmable data processing device to generate a machine, such that an apparatus for implementing functions specified in one or more flows in the flowcharts and/or one or more blocks in the block diagrams is generated through instructions executed by a computer or a processor of another programmable data processing device. The program may be stored in a computer-readable storage medium, which may include a Read Only Memory (ROM), a Random Access Memory (RAM), a magnetic disk, or an optical disk.

The above implementations illustrate but do not limit the present disclosure, and those skilled in the art can design a plurality of alternative examples within the scope of the claims. Those skilled in the art should recognize that appropriate adjustments, modifications, etc., may be made to specific implementations without departing from the scope of the present disclosure as defined in the appended claims. Therefore, any modifications and changes made according to the spirit and principles of the present disclosure are within the scope of the present disclosure as defined by the appended claims.

The invention claimed is:

1. A method for processing a segmented resource, comprising:
    receiving a grant sent by a network device, wherein the grant is used for allocating a transmission resource to a terminal device;
    determining, by a physical layer or a Media Access Control layer of the terminal device, that the transmission resource contains at least one segmented resource; and
    starting or restarting a Configured Grant timer based on the transmission resource or the segmented resource;

wherein the starting or restarting the Configured Grant timer based on the transmission resource or the segmented resource comprises:
starting or restarting the Configured Grant timer when the transmission resource is a Configured Grant resource or when the transmission resource is a Dynamic Grant resource and a corresponding Hybrid Automatic Repeat reQuest (HARQ) process is a HARQ process configured for the Configured Grant resource.

2. The method according to claim 1, wherein the starting or restarting the Configured Grant timer comprises:
starting or restarting the Configured Grant timer at one of following time: when a Media Access Control layer Protocol Data Unit (MAC PDU) is acquired, when the MAC PDU is sent, when a retransmission is indicated, or when a grant starts to be transmitted, when the transmission resource is transmitted, when the segmented resource is transmitted, when a MAC PDU corresponding to the transmission resource is transmitted, when a MAC PDU corresponding to the segmented resource is transmitted, when retransmission of a HARQ process corresponding to the segmented resource is indicated, when retransmission of a MAC PDU corresponding to the segmented resource is indicated, when retransmission of a HARQ process corresponding to the transmission resource is indicated, when retransmission of a MAC PDU corresponding to the transmission resource is indicated.

3. The method according to claim 1, wherein the determining, by the Media Access Control layer of the terminal device, that the transmission resource contains the at least one segmented resource comprises:
determining, by the Media Access Control layer of the terminal device, that the transmission resource contains the at least one segmented resource according to first information, wherein the first information is resource configuration information of a Physical Uplink Shared Channel (PUSCH).

4. The method according to claim 3, wherein the first information is indication information in Downlink Control Information (DCI) or a Radio Resource Control (RRC) signaling, which is used for indicating whether the transmission resource is a segmented resource, or whether the transmission resource is a resource crossing a slot boundary, or whether the transmission resource is a resource that is segmented by a flexible symbol and a downlink symbol.

5. The method according to claim 3, wherein the first information is information sent by the physical layer of the terminal device to the Media Access Control layer, which is used for indicating whether the transmission resource is a segmented resource, or whether the transmission resource is a resource crossing a slot boundary, or whether the transmission resource is a resource that is segmented by a flexible symbol and a downlink symbol.

6. The method according to claim 1, wherein the determining, by the Media Access Control layer of the terminal device, that the transmission resource contains the at least one segmented resource comprises:
determining, by the Media Access Control layer, that the transmission resource contains the at least one segmented resource according to one of following situations:
resource configuration information of a Physical Uplink Shared Channel (PUSCH); indication information in Downlink Control Information (DCI) or a Radio Resource Control (RRC) signaling; at least one transmission resource crosses a slot boundary; a duration of at least one transmission resource crosses a flexible symbol and a downlink symbol; at least one grant crosses slots; or, a duration of at least one grant resource crosses a flexible symbol or a downlink symbol.

7. The method according to claim 1, further comprising:
encoding data independently based on the segmented resource.

8. The method according to claim 7, further comprising:
sending, by the Media Access Control layer, a segmented grant to a Hybrid Automatic Repeat reQuest (HARQ) entity, wherein the segmented grant is a grant corresponding to the transmission resource and/or the segmented resource; and
sending, by the terminal device, the data according to the transmission resource and/or the segmented resource.

9. The method according to claim 7, wherein the sending, by the Media Access Control layer, the segmented grant to the HARQ entity further comprises:
indicating, by the Media Access Control layer, second information to the HARQ entity, wherein that second information includes at least one piece of following information:
indicating that the grant is a segmented grant;
indicating a size of an initial segment grant of the segmented grant;
indicating a size of the nominal repetition; and
indicating a size of a grant corresponding to the segmented grant.

10. The method according to claim 7, wherein if the transmission resource or the segmented grant is a part of a repetition and grant bundle, and the transmission resource or the segmented grant is not a first repetition, then the nominal repetition, an initial segmented grant of the segmented grant, or an initial segmented grant of the nominal repetition is processed according to a retransmission or an independent uplink (UL) grant.

11. A method for processing a segmented resource, comprising:
sending a grant to a terminal device, wherein the grant is used for allocating a transmission resource to the terminal device, wherein a Media Access Control layer of the terminal device determines that the transmission resource contains at least one segmented resource; and starts or restarts a Configured Grant timer based on the transmission resource or the segmented resource; and
receiving data sent by the terminal device through the transmission resource;
wherein the starting or restarting the Configured Grant timer comprises:
starting or restarting the Configured Grant timer when the transmission resource is a Configured Grant resource or when the transmission resource is a Dynamic Grant resource and a corresponding Hybrid Automatic Repeat reQuest (HARQ) process is a HARQ process configured for the Configured Grant resource.

12. The method according to claim 11, wherein the starting or restarting the Configured Grant timer comprises:
starting or restarting the Configured Grant timer at one of following time: when a Media Access Control layer Protocol Data Unit (MAC PDU) is acquired, when the MAC PDU is sent, when a retransmission is indicated, or when a grant starts to be transmitted, when the transmission resource is transmitted, when the segmented resource is transmitted, when a MAC PDU corresponding to the transmission resource is transmitted, when a MAC PDU corresponding to the segmented resource is transmitted, when retransmission of a HARQ process corresponding to the segmented resource is indicated, when retransmission of a MAC PDU corresponding to the segmented resource is indicated, when retransmission of a HARQ process corresponding to the transmission resource is indicated, when retransmission of a MAC PDU corresponding to the transmission resource is indicated.

13. The method according to claim 11, further comprising:
encoding, by the terminal device, data independently based on the segmented resource.

14. An apparatus for processing a segmented resource, comprising:
a network interface configured to receive a grant sent by a network device, wherein the grant is used for allocating a transmission resource to a terminal device;
a processor configured to determine that the transmission resource contains at least one segmented resource; and to start or restart a Configured Grant timer based on the transmission resource or the segmented resource;
wherein the processor is specifically configured to start or restart the Configured Grant timer based on the transmission resource or the segmented resource when the transmission resource is a Configured Grant resource or when the transmission resource is a Dynamic Grant resource and a corresponding Hybrid Automatic Repeat reQuest (HARQ) process is a HARQ process configured for the Configured Grant resource.

15. The apparatus according to claim 14, wherein the processor is specifically configured to start or restart the Configured Grant timer based on the transmission resource or the segmented resource at one of following time: when a Media Access Control layer Protocol Data Unit (MAC PDU) is acquired, when the MAC PDU is sent, when a retransmission is indicated, when a grant starts to be transmitted, when the transmission resource is transmitted, when the segmented resource is transmitted, when a MAC PDU corresponding to the transmission resource is transmitted, when a MAC PDU corresponding to the segmented resource is transmitted, when retransmission of a HARQ process corresponding to the segmented resource is indicated, when retransmission of a MAC PDU corresponding to the segmented resource is indicated, when retransmission of a HARQ process corresponding to the transmission resource is indicated, when retransmission of a MAC PDU corresponding to the transmission resource is indicated.

16. The apparatus according to claim 14, wherein
the processor is further configured to independently encode data based on the segmented resource.

17. An uplink transmission apparatus comprising a processor, a memory, and a network interface; the processor invokes a program in the memory to execute the method for processing the segmented resource according to claim 11, and send out an execution result through the network interface.

* * * * *